(12) United States Patent
Maruyama et al.

(10) Patent No.: US 7,610,489 B2
(45) Date of Patent: Oct. 27, 2009

(54) AUTHENTICATION DEVICE, AUTHENTICATION SYSTEM, AUTHENTICATION METHOD, PROGRAM AND RECORDING MEDIUM

(75) Inventors: Hiroshi Maruyama, Tokyo (JP); Taiga Nakamura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 10/739,817

(22) Filed: Dec. 18, 2003

(65) Prior Publication Data
US 2004/0177280 A1 Sep. 9, 2004

(30) Foreign Application Priority Data
Dec. 25, 2002 (JP) ............... 2002-375449

(51) Int. Cl.
*G06F 21/00* (2006.01)
(52) U.S. Cl. .............. 713/182; 713/154; 713/161; 713/168; 713/169; 713/170; 713/183; 713/184; 713/176; 726/2; 726/27; 726/28; 380/229; 380/232
(58) Field of Classification Search ............. 713/154, 713/161, 168–170, 182–184, 176; 380/229, 380/232; 726/2, 27–28
See application file for complete search history.

(56) References Cited

U.S. PATENT DOCUMENTS

| 6,438,230 B1 * | 8/2002 | Moore | 380/42 |
| 6,643,784 B1 * | 11/2003 | McCulligh | 726/18 |
| 6,671,672 B1 * | 12/2003 | Heck | 704/273 |
| 7,240,339 B2 * | 7/2007 | Cragun et al. | 717/143 |
| 7,451,322 B2 * | 11/2008 | Lee | 713/183 |
| 2001/0056400 A1 * | 12/2001 | Shichi | 705/41 |
| 2003/0046541 A1 * | 3/2003 | Gerdes et al. | 713/168 |
| 2003/0070098 A1 * | 4/2003 | Tokita | 713/202 |
| 2003/0093367 A1 * | 5/2003 | Allen-Rouman et al. | 705/39 |

FOREIGN PATENT DOCUMENTS

| JP | 07-013930 | 1/1995 |
| JP | 2000-235630 | 8/2000 |

OTHER PUBLICATIONS

Japanese Publication No. 05-227162 published Sep. 3, 1993, Abstract only.

* cited by examiner

*Primary Examiner*—Michael J Simitoski
*Assistant Examiner*—Canh Le
(74) *Attorney, Agent, or Firm*—Scully, Scott, Murphy & Presser, P.C.; Kenneth R. Corsello, Esq.

(57) ABSTRACT

To prevent an input password from being stolen by an invalid authentication device. An authentication device 10 for authenticating an inputter based on an input password accepted from the inputter is provided with a first input part 110 for allowing a first part of the input password to be inputted; a confirmation information output part 120 for outputting confirmation information known to the valid inputter in advance when the first part 10 is valid, the confirmation information indicating to the user that the authentication device is valid; a second input part 130 for allowing a second part following the first part of the input password to be inputted; and a determination part 140 for determining that the inputter is valid when the first part and the second part are valid.

12 Claims, 11 Drawing Sheets

Fig 2

| Inputter identifying information | Input password | | | | Confirmation information | | | Information related to invalidity information | | | | | |
|---|---|---|---|---|---|---|---|---|---|---|---|---|---|
| | First part 50-1 | ... | First part 50-N | Second part 60 | Confirmation information 80-1 | ... | Confirmation information 80-N | Content of invalid first part | | | Invalidity information | | |
| | | | | | | | | First part 50-1 | ... | Nth part 50-N | Invalidity information 70-1 | ... | Invalidity information 70-N |
| ID1 | B | ... | C | D | E | ... | G | X | ... | Y | Z | ... | W |
| | | | | | | | | I | ... | J | B | ... | K |
| ...... | ...... | ...... | ...... | ...... | ...... | ...... | ...... | ...... | ...... | ...... | ...... | ...... | ...... |

115

AUTHENTICATION DEVICE, AUTHENTICATION SYSTEM, AUTHENTICATION METHOD, PROGRAM AND RECORDING MEDIUM

FIELD OF THE INVENTION

The present invention relates to an authentication device, an authentication system, an authentication method, a program and a recording medium. In particular, the present invention relates to an authentication device, an authentication system, an authentication method, a program and a recording medium enabling validity of the authentication device to be determined.

BACKGROUND ART

There has been proposed a system for enabling cipher communication by providing a common secret for both of a valid sender and a valid receiver in advance. In such a system, the sender and the receiver can authenticate each other by obtaining the secret of their counterpart before starting communication, to determine whether or not it corresponds to his own secret (see Patent document 1).

Published Unexamined Patent Application No. 5-227162

[Problems to be Solved by the Invention]

In the system described above, however, it may occur that the sender finds the secret of the counterpart to be invalid after sending the valid secret he has, thus, the valid secret is disclosed to the invalid counterpart.

Thus, the object of the present invention is to provide an authentication device, an authentication system, an authentication method, a program and a recording medium capable of solving the above problem. The object is achieved by combinations of the characteristics described in the independent Claims in the Claims. More advantageous examples of the present invention are Claimed in the dependent Claims.

SUMMARY OF THE INVENTION

According to a first embodiment of the present invention, there are provided an authentication device for authenticating an inputter based on the input password accepted from the inputter, the authentication method comprising: a first input part for allowing the first part of the input password to be inputted, a confirmation information output part for outputting confirmation information known to the valid inputter in advance when the first part is valid, the confirmation information indicating to the user that the authentication device is valid, the second input part for allowing a second part following the first part of the input password to be inputted, and a determination part for determining that the inputter is valid when the first part and the second part are valid; an authentication system; and an authentication method, a program and a recording medium recording the program for implementing the authentication device.

The summary of the invention described above does not enumerate all the necessary characteristics of the present invention, and subcombinations of these characteristics are also to be the invention.

[Preferred Embodiment]

The present invention will be described below through embodiments thereof. The embodiments described below are not intended to limit the invention to the scope of the Claims, and all the combinations of the characteristics described in the embodiments are not necessarily required as the solution means of the invention.

FIG. 1 is a functional block diagram of an authentication device 10. The authentication device 10 is intended to authenticate an inputter based on the input password accepted from the inputter. The authentication device 10 is also intended to enable the valid inputter to confirm that the authentication device 10 is valid by outputting confirmation information indicating that the authentication device 10 is valid at the stage where the valid inputter has partially inputted his input password. This enables the inputter to prevent his whole input password from being stolen by a false authentication device 10. Furthermore, an invalid inputter cannot steal the confirmation information until he has partially inputted a valid input password. Thus, it is also difficult for him to create a false authentication device 10 to output the valid confirmation information.

The authentication device 10 is, for example, a mobile communication terminal such as PDA, and authenticates an inputter based on the input password accepted from the inputter. The authentication device 10 permits access to information stored in the inside thereof and use of an I/O device, etc. installed therein when it determines that the inputter is valid. The authentication device 10 comprises an input device 100, a first input part 110, an authentication information storing part 115, a confirmation information output part 120, a second input part 130, a determination part 140 and an output device 150.

The input device 100 is, for example, a touch panel and displays multiple characters for an inputter for him to select some of the characters. The input device 100 accepts the characters selected by the inputter as a login ID, an example of inputter identifying information for identifying the inputter, and sends them to the authentication information storing part 115. The input device 100 also accepts the characters selected by the inputter as the characters composing his input password, and sends them to the first input part 110 and the confirmation information output part 120. The input device 100 may be a keyboard, a microphone or a pointing device instead of a touch panel. The input password may be composed of alphabets, kana and kanji characters, symbols, numerals or any combination of these. The input password may be inputted by selecting pictures displayed on the screen.

The first input part 110 allows the inputter to input a first part of the input password by means of the input device 100, and sends the first part to the confirmation information output part 120 and the determination part 140. The authentication information storing part 115 stores an input password, confirmation information, and invalidity information to be outputted when the first part is not valid, for each of the multiple inputters to be authenticated. The authentication information storing part 115 sends information associated with the login ID received from the input device 100, to the confirmation information output part 120 and the determination part 140. If the first part is valid, the confirmation information output part 120 selects confirmation information associated with the inputter to be authenticated from the authentication information storing part 115, and outputs it to the output device 150. The confirmation information output part 120 outputs, for example, characters as the confirmation information. Alternatively, the confirmation information output part 120 may output screen color, an image to be displayed on the screen, a musical scale, etc. as the confirmation information. In this embodiment, the authentication device 10 notifies confirmation information to valid inputters in advance. Confirmation information may be set in advance for the authentication device 10 by valid inputters instead.

The second input part 130 allows the inputter to input the second part of the input password by means of the input device 100, and sends the second part to the determination part 140. The determination part 140 determines that the first and the second parts are valid when the input password obtained from the authentication information storing part 115 corresponds to the received first and the second parts. The determination part 140 sends a validity notification to the output device 150 that indicates validity of the inputter. In this case, the determination part 140 may perform a login process of inputter.

The output device 150 outputs to the inputter the confirmation information received from the confirmation information output part 120 and the validity notification received from the determination part 140. In addition, the output device 150 may display an input field for an input password to be inputted in advance.

FIG. 2 shows an example of information stored in an authentication information storing part 115. For each of multiple inputters to be authenticated, the authentication information storing part 115 stores inputter identifying information for identifying the inputter, an input password correspondent to the inputter, confirmation information to be outputted to the inputter, and invalidity information to be outputted in association with an invalid first part.

For example, the authentication information storing part 115 stores "B . . . CD" as the input password of an inputter whose inputter identifying information (for example, login ID) is "ID1". Specifically, the authentication information storing part 115 stores "B", a first part 50-1, as the first character of the input password, "C", a first part 50-N, as the Nth character, and "D", a second part 60, as the N+1th character. In other words, the determination part 140 determines the inputter to be valid when the input password inputted by the inputter corresponds to the first parts 50-1 to 50-N and the second part 60.

The authentication information storing part 115 also stores "E . . . G" as confirmation information to be outputted to the inputter whose inputter identifying information is "ID1". Specifically, the authentication information storing part 115 stores each of confirmation informations 80-1 to 80-N to be outputted when the first part is valid, in association with each of the first parts 50-1 to 50-N.

For example, the confirmation information output part 120 outputs "E", the confirmation information 80-1, associated with the first part 50-1 when "B", the valid first part 50-1, is inputted. If "C", the valid first part 50-N, is inputted and all the first parts 50-1 to 50-N-1, which have been accepted earlier than the first part 50-N, are valid, then the confirmation information output part 120 outputs "G", the confirmation information 80-N associated with the first part 50-N. In other words, when one first part is inputted, the confirmation information output part 120 outputs confirmation information associated with the one first part if the one first part is valid and all the first parts accepted earlier than the one first part are also valid.

Furthermore, the authentication information storing part 115 stores invalidity information associated with the content of the first parts, in association with the inputter whose inputter identifying information is "ID1". For example, the authentication information storing part 115 stores "X" as the content of the invalid first part 50-1 and "Z" as invalidity information 70-1 associated with "X".

In other words, when "X" is inputted as the first part 50-1 of the input password at the first input part 110, the confirmation information output part 120 determines that the first part 50-1 is not valid because "X" does not correspond to "B", the valid first part 50-1 of the input password. Then, the confirmation information output part 120 outputs "Z", the invalidity information associated with both of "ID1" indicating the inputter to be authenticated and "X", the content of the first part 50-1. Since invalidity information is inputted according to inputters, an inputter trying invalid access cannot distinguish between confirmation information and invalid information easily, even if he changes the inputter identifying information variously.

In the example shown in the figure, the authentication information storing part 115 stores all the possible combinations to be inputted by an inputter as the content of the invalid first part 50. For example, when the characters to be inputted by an inputter are capital letters of alphabet, invalid information is stored for all the combinations from "A . . . A" to "Z . . . Z". When one inputted first part 50-N or any first part accepted earlier than the one first part is invalid, the confirmation information output part 120 selects the content identical to the one first part and the first parts accepted earlier than the one first part from the "content of invalid first part 50" field. The confirmation information output part 120 selects invalidity information associated with the selected content from an "invalid information" field and outputs it.

In this way, the confirmation information output part 120 outputs invalidity information selected based on the content of the one inputted first part and the first parts accepted earlier than the one first part.

Alternatively, the confirmation information output part 120 may output information randomly selected from information that can be outputted as confirmation information (for example, capital letters of alphabet) as invalidity information when the first part is not valid. In this case, the authentication information storing part 115 may store invalidity information already outputted in association with the content of an invalid first part already inputted. In other words, the authentication information storing part 115 can output the same invalidity information when a first part with the same content is inputted again.

When "I" is inputted as the first character of the input password at the first input part 110, the confirmation information output part 120 determines that the first part 50-1 is not valid because it does not correspond to "B", the first character of the valid input password. The confirmation information output part 120 then outputs "B" which is the invalidity information associated with both of "ID1" indicating the inputter to be authenticated and "I", the content of the first part 50-1.

In this way, the confirmation information output part 120 may output "B" identical to the confirmation information when the invalid first part 50-1 is predetermined data, for example, when it corresponds to "I" which is predetermined data. In this case, the confirmation information output part 120 outputs invalidity information different from the confirmation information "B", for example "Z", when the invalid first part 50-1 is not "I" but "X", for example. In other words, the authentication device 10 can output either of information identical to the confirmation information and information different from the confirmation information for an invalid first part 50-1. Thus, a malicious inputter trying to steal an input password cannot easily determine whether or not the inputted first part 50 is valid, which prevents the input password from being easily stolen.

The authentication information storing part 115 may store at least one of the inputter identifying information, the input password, the confirmation information, and the invalidity information shown in the figure after encryption thereof. In this case, the authentication information storing part 115 can prevent a malicious user from easily stealing the other user's input passwords.

FIG. 3 shows a display example of an output device 150. The output device 150 displays a login ID specifying field 152, an input password input field 155 and a confirmation information output field 158. For example, the input device 100 allows a login ID to be inputted in the login ID specifying field 152. Alternatively, the input device 100 may obtain the login ID from an IC card or a magnetic card inserted by an inputter without the output device 150 displaying the login ID specifying field 152.

The input device 100 allows an input password to be inputted in a predetermined input password input field 155. In other words, the first input part 110 allows first parts 50-1 to 50-N in the input password input field 155, a second input part 130 allows a second part 60 following the first parts 50-1 to 50-N in the input password input field 155. The output device 150 may display the first parts 50-1 to 50-N and the second part 60 inputted in the input password input field 155 as "*" regardless of the content of the inputted information.

When the first parts 50-1 to 50-N are valid, the confirmation information output part 120 outputs confirmation information to the confirmation information output field 158, which has been known to the valid inputter in advance and indicates to the valid inputter that the authentication device 10 is valid. For example, the confirmation information output part 120 outputs confirmation information 80-1 when the first part 50-1 is valid. When any of the first parts 50-1 to 50-N is not valid, the confirmation information output part 120 outputs invalidity information to a confirmation information output field 158.

When a character is inputted as each of the first parts 50-1 to 50-N, the confirmation information output part 120 outputs an alphabet character as each of confirmation informations 80-1 to 80-N. Alternatively, the confirmation information output part 120 may output one character for input of multiple characters, or multiple characters for input of one character. In other words, the confirmation information output part 120 may output multiple characters as each of confirmation informations 80-1 to 80-N and invalidity informations 70-1 to 70-N, and the first input part 110 allows multiple characters to be inputted as each of the first parts 50-1 to 50-N.

FIG. 4 shows the operation flow of the authentication device 10. The input device 100 allows an inputter to input his login ID (S 100). The output device 150 then displays input fields (S110). At this step, if the authentication device 10 has already determined multiple times that the inputter is not valid for the same login ID, it may display the input fields after a duration of standby time depending on the frequency, for example, after an exponentially long duration of standby time depending on the frequency. In this case, the authentication device 10 can make it difficult for a malicious inputter to steal the input password for the same login ID.

The first input part 110 allows a first part of an input password to be inputted (S120). Then the confirmation information output part 120 determines whether or not the first part is valid and all the first parts accepted earlier than the first part are also valid (S130). If the first part is valid and all the first parts accepted earlier than the first part are also valid (S130: YES), then the confirmation information output part 120 outputs confirmation information (S140). On the contrary, if the first part or any of the first parts accepted earlier than the first part is invalid (S130: NO), then the confirmation information output part 120 outputs invalidity information (S150). At this step, if the invalid first part is predetermined data, the confirmation information output part 120 may output validity information identical to the confirmation information.

Then, the authentication device 10 returns the process to S120 if all the multiple first parts have not been inputted (S160: NO). In other words, the confirmation information output part 120 outputs confirmation information each time a valid first part is inputted until all the multiple first parts have been inputted.

If all the multiple first parts have been inputted (S 160: YES), then the second input part 130 allows a second part to be inputted (S170). If the determination part 140 determines that both the multiple first parts and the second part are valid (S180: YES), then it determines that the inputter is valid (S190). In this case, the determination part 140 may output a validity notification to the inputter or permit him to login to the authentication device 10.

FIG. 5 shows an outline of an authentication system 20 in a first variation example. The authentication system 20 represented by a kiosk terminal comprises an input terminal 200 for accepting an input password from an inputter, an authentication server 290 for causing the input terminal 200 to authenticate the inputter, and an authenticate information database 298. The input terminal 200 and the authentication server 290 can be mutually authenticated by means of a predetermined strong secret. The input terminal 200 allows a login ID to be inputted and obtains confirmation information associated with a valid inputter identified with the login ID, from the authentication server 290. The authentication server 290 has a confirmation information transmission part 295. When the confirmation information transmission part 295 determines that the input terminal 200 is valid using the secret, it obtains confirmation information from the authenticate information database 298 and sends it to the input terminal 200 in response to a direction by the input terminal 200. The confirmation information transmission part 295 may further obtain an input password associated with the inputter and invalidity information from the authenticate information database 298 and send them to the input terminal 200. The input terminal 200 authenticates the inputter using the confirmation information, the input password and the invalidity information it has received.

FIG. 6 is a functional block diagram of the input terminal 200 in the first variation example. The input terminal 200 comprises an input device 100, a first input part 110, a confirmation information obtaining part 118, a confirmation information output part 120, a second input part 130, a determination part 140 and an output device 150. In other words, the input terminal 200 is provided with the confirmation information obtaining part 118 in addition to the authentication device 10 described with reference to FIG. 1. The input terminal 200 may not be provided with the authentication information storing part 115 unlike the authentication device 10 described with reference to FIG. 1. Since the operation of each block in the input terminal 200 is almost identical to each block with the same reference numeral shown in the authentication device 10, only different points are now described.

The input device 100 accepts the characters selected by an inputter as a login ID, an example of inputter identifying information for identifying the inputter and sends it to the confirmation information obtaining part 118. The confirmation information obtaining part 118 obtains confirmation information from the confirmation information transmission part 295 based on the login ID, which has been known to the valid inputter in advance from the authentication server 290 and indicates to the valid inputter that the input terminal 200 is valid, and sends it to the confirmation information output part 120 and the determination part 140. The confirmation information obtaining part 118 may obtain an input password and invalidity information associated with the login ID from the confirmation information transmission part 295 and send them to the confirmation information output part 120 and the determination part 140. The confirmation information output part 120 and the determination part 140 then receive the confirmation information and the invalidity information from the confirmation information obtaining part 118.

FIG. 7 shows the operation flow of the authentication system 20 in the first variation example. When the input device 100 allows an inputter to input his login ID, the confirmation information obtaining part 118 sends the login ID to the confirmation information transmission part 295, in association with information identifying the input terminal 200 (S200). At this step, the confirmation information obtaining part 118 may encrypt the login ID or add a digital sign using a secret predetermined between the input terminal 200 and the authentication server 290. The authentication server 290 then determines whether or not the input terminal 200 is valid (S210). Alternatively, the authentication server 290 may further determine whether or not the input terminal 200 is valid when it is directed to determine the validity of the input terminal 200.

If it is determined that the input terminal 200 is valid (S210: YES), then the confirmation information transmission part 295 sends the input password, the confirmation information and the invalidity information to the input terminal 200 (S220). In response to this, the input terminal 200 authenticates the inputter (S230). Since the detail of the authentication of the inputter is almost identical to the process from S110 to S190 with reference to FIG. 4, description thereof will be omitted.

In this way, the authentication system 20 enables an inputter to determine whether or not the input terminal 200 to which his password is to be inputted is the one authenticated by the authentication server 290. For example, the inputter can determine whether or not an input terminal 200 located at a public place such as at a street is valid by inputting the first part into the input terminal 200 and checking if the confirmation information is valid.

As another example, the authentication server 290 may authenticate an inputter instead of the input terminal 200. More specifically, the input terminal 200 sends the login ID and the first and second parts of the input password each time each of them has been inputted. In this case, the authentication server 290, instead of the input terminal 200, may have the confirmation information output part 120 and the determination part 140 to determine validity of the first part and the second part. This form enables the configuration of the input terminal 200 to be simplified.

FIG. 8 is a functional block diagram of an authentication device 10 in a second variation example. The authentication device 10 in this variation example may not be provided with the input device 100 or the output device 150 unlike the authentication device 10 shown in FIG. 1. As for the configuration except for these, there are used members almost identical to those with the same reference numerals of the authentication device 10 shown in FIG. 1, so that only differences are now described.

The authentication device 10 communicates with a telephone set 30 located remotely from the authentication device 10. A first input part 110 allows a first part to be inputted via buttons 310 of the telephone set 30. A confirmation information output part 120 outputs confirmation information as voice signals to a receiver 320 of the telephone set 30.

In this way, the authentication device 10 in this variation example can output confirmation information as voice signals even to the remotely provided telephone set 30 which cannot display characters or images and is dedicated for voice communication.

FIG. 9 is a functional block diagram of an authentication system 300 in a third variation example. The authentication system 300 is provided with a service site 330 providing a predetermined service to a valid inputter, and a mutual authentication service provider 340 communicating with the service site 330 via a network. The service site 330 is, for example, a web server in a WWW (World Wide Web) system and authenticates an inputter accessing thereto via the network using the mutual authentication service provider 340. The service site 330 provides the predetermined service to an inputter who has been determined to be valid based on the authentication result received from the mutual authentication service provider 340. The mutual authentication service provider 340 authenticates the inputter based on the input password accepted from him and sends the inputter authentication result to the service site 330. The mutual authentication service provider 340 may carry out encrypted communication with the service site 330 using a predetermined secret.

The mutual authentication service provider 340 has an input device 100, a first input part 110, a confirmation information obtaining part 118, a confirmation information output part 120, a second input part 130, a determination part 140, a notification part 145 and an output device 150. In other words, the mutual authentication service provider 340 is further provided with the confirmation information obtaining part 118, an input password obtaining part 125 and the notification part 145 in addition to the authentication device 10 described with regard to FIG. 1. The mutual authentication service provider 340 may not be provided with the authentication information storing part 115 unlike the authentication device 10 described with regard to FIG. 1. Since the operation of each block in the mutual authentication service provider 340 is almost identical to each block with the same reference numeral in the authentication device 10, only differences are now described.

The input password obtaining part 125 obtains a valid input password predetermined by a valid inputter in advance, and sends it to the confirmation information output part 120 and the determination part 140. The confirmation information obtaining part 118 obtains confirmation information, which has been known to a valid inputter by the service site 330 in advance and indicates to the valid inputter that the service site 330 is valid, and sends it to the confirmation information output part 120 and the determination part 140. The confirmation information output part 120 outputs the confirmation information received from the confirmation information obtaining part 118, to the output device 150 if the first part is valid in comparison with the received valid input password. The determination part 140 determines that the first and second parts are valid and notifies it to the notification part 145 if the received valid input password corresponds to the received first and second parts. In response to this, the notification part 145 sends to the service site 330 a validity notification indicating validity of the inputter.

FIG. 10 shows the operation flow of the authentication system 300 in the third variation example. The input password obtaining part 125 obtains a valid input password from an inputter in advance (S300). The service site 330 notifies confirmation information to the valid inputter of in advance (S310). The service site 330 then sends the confirmation information to the mutual authentication service provider 340 (S320). The confirmation information obtaining part 118 obtains the confirmation information from the service site 330 (S330). The mutual authentication service provider 340 authenticates the inputter using the obtained input password and confirmation information (S340). Since the detail of the authentication of the inputter is almost identical to the process from S100 to S170 described with reference to FIG. 4, description thereof will be omitted.

Then the determination part 140 determines whether or not the inputter is valid by determining whether or not both of the first and second parts of the input password are valid (S350). If the inputter is valid, the notification part 145 sends a validity notification indicating validity of the inputter to the service site 330 (S360). In respond to this, the service site 330 provides a predetermined service to the inputter.

In this way, the mutual authentication service provider 340 in this variation example enables a mutual authentication service to be provided to mutual authentication of validity for the service site 330 between the inputter and the service site 330 which is not provided with a function of authenticating the inputter.

FIG. 11 shows an example of a hardware configuration of the authentication device 10 according to the embodiment and the variation examples shown above. An authentication device 10 according to the embodiment comprises: a CPU peripheral section provided with a CPU 1000, a RAM 1020, a graphic controller 1075 and a display device 1080 mutually connected via a host controller 1082; an I/O section provided with a communication interface 1030 and an IC card slot 1055 connected to the host controller 1082 via an I/O controller 1084, and a legacy I/O section provided with a ROM 1010 and an I/O chip 1070 connected to the I/O controller 1084.

The host controller 1082 connects the RAM 1020 to the CPU 1000 and the graphic controller 1075 which access to the RAM 1020 at a high transmission rate. The CPU 1000 operates based on programs stored in the ROM 1010 and the RAM 1020 and controls each part. The graphic controller 1075 obtains image data generated by the CPU 1000 onto a frame buffer in the RAM 1020 and displays it on the display device 1080. Alternatively, the graphic controller 1075 may include a frame buffer for storing image data generated by the CPU 1000 in the inside thereof.

The I/O controller 1084 connects the host controller 1082 to the communication interface 1030 and the IC card slot 1055 which are relatively high speed I/O devices. The communication interface 1030 communicates with other devices with a network. The IC card slot 1055 reads a program or data from the IC card 1058 and provides it to the RAM 1020 via the I/O controller 1084.

The ROM 1010 and a relatively low speed I/O device, such as the I/O chip 1070, are connected to the I/O controller 1084. The ROM 1010 stores a boot program executed by the CPU 1000 during start-up, programs dependent on the hardware of the authentication device 10, etc. The I/O chip 1070 connects to a flexible disk 1090 and to various I/O devices, for example, via a parallel port, serial port, keyboard port, and mouse port.

The program provided by the authentication device 10 is stored in a recording medium such as the IC card 1058 and provided by a user. The program is read from the recording medium, installed in the authentication device 10 via the I/O controller 1084, and executed in the authentication device 10.

The program installed and executed in the authentication device 10 includes an input device implementing module, a first input module, a confirmation information storing module, a confirmation information output module, a second input module, a determination module and an output device implementing module. Since the operation which each module causes the authentication device 10 to execute is identical to that of each correspondent member in the authentication device 10 described with reference to FIGS. 1 to 4 and FIG. 8, description thereof will be omitted. The program for implementing the authentication device 10 may be stored in the recording medium to be provided to the authentication device 10, or it may be installed via a network.

The hardware configuration of the input terminal 200 and of the mutual authentication service provider 340 may be identical to that shown in the figure. Alternatively each of the input terminal 200 and the mutual authentication service provider 340 may be further provided with a hard disk drive, a CD-ROM drive and an FD drive. The program for implementing the input terminal 200 may be installed in the recording medium to be provided to the input terminal 200, or it may be installed from the authentication server 290 via a network. The program installed and executed in the input terminal 200 includes an input device implementing module, a first input module, a confirmation information storing module, a confirmation information output module, a second input module, a determination module, an output device implementing module and a confirmation information obtaining module. Since the operation which each module causes the input terminal 200 to execute is identical to that of each correspondent member in the input terminal 200 described with reference to FIGS. 5 to 7, description thereof will be omitted.

The program for implementing the mutual authentication service provider 340 may be stored in the recording medium to be provided to the mutual authentication service provider 340, or it may be installed from the service site 330 via a network. The program installed and executed in the mutual authentication service provider 340 includes an input device implementing module, a first input module, a confirmation information storing module, a confirmation information output module, a second input module, a determination module, an output device implementing module, a confirmation information obtaining module, an input password obtaining module and a notification module. Since the operation which each module causes the mutual authentication service provider 340 to execute is identical to that of each correspondent member in the mutual authentication service provider 340 described with reference to FIGS. 9 and 10, description thereof will be omitted.

The program or module shown above may be stored in an external recording medium. In addition to a flexible disk and CD-ROM, an optical recording medium such as DVD and PD, a magneto-optic recording medium such as MD, a tape medium, a semiconductor memory such as an IC card, etc. can be used as the recording medium. A storage device such as a hard disk or RAM installed in a server system connected to a dedicated communication network or the Internet may be used as a recording medium to provide the program to the authentication device 10, the input terminal 200 or the mutual authentication service provider 340 via the network.

As apparent from the description above, the authentication device 10 can authenticate an inputter based on the input password accepted from the inputter and output to the inputter a notification of validity of the authentication device 10 based on the first part of the input password. In other words, the inputter can determine whether or not the authentication device 10 is valid when having inputted only the first part of the input password, thereby preventing the whole password from being stolen by an invalid authentication device.

When the first part of the input password is not valid, the authentication device 10 outputs invalidity information by which the invalid inputter cannot determine whether or not the first part of the input password is valid. Thus, the authentication device 10 can prevent stealth of an input password by an invalid inputter, thereby preventing invalid access efficiently.

When using the authentication device 10 described in the embodiment, an inputter has to remember not only his password but also confirmation information, which may seem troublesome in comparison with the existing authentication system. This problem, however, can be easily solved. For example, the inputter can remember a relatively long, single password to use each of two sets of characters composed of every other character of the password as an input password and confirmation information, respectively. For example, the inputter may remember "Falcon32" as a password and use "Flo3" as the input password and "acn2" as the confirmation information.

According to the embodiment shown above, an authentication device, an authentication system, an authentication method, a program and a recording medium described below can be realized.

(Item 1) An authentication device for authenticating an inputter based on an input password accepted from the inputter, the authentication device comprising: a first input part for allowing the first part of the input password to be inputted; a confirmation information output part for outputting confirmation information known to the valid inputter in advance when the first part is valid, the confirmation information indicating to the user that the authentication device is valid; a second input part for allowing the second part of the input password to be inputted; and a determination part for determining that the inputter is valid when the first part and the second part are valid.

(Item 2) The authentication device described in item 1; wherein, when the first part is invalid, the confirmation information output part outputs information identical to the confirmation information for certain predetermined inputs, and outputs invalidity information different from the confirmation information for other inputs.

(Item 3) The authentication device described in item 1 further comprising an authentication information storing part for storing output data to be outputted in association with the content of the inputted invalid first part, for each of a plurality of the inputters; wherein the confirmation information output part outputs the invalidity information associated with both of the inputter and the content of the first part to be authenticated.

(Item 4) The authentication device described in item 1; wherein the first input part allows a plurality of the first parts to be inputted; each of the plurality of first parts is associated with each of a plurality of the confirmation information data to be outputted when the first part is valid; and the confirmation information output part, when a subpart of the first part is inputted, outputs the confirmation information associated with subpart if the subpart is valid and all the subparts preceding to the subparts are also valid, and outputs the invalidity information selected based on the subparts inputted so far if any of these subparts is invalid.

(Item 5) The authentication device described in item 1; wherein the first input part allows the first part to be inputted in a predetermined input field; and the second input part allows the second part to be inputted in the input field subsequently after the first part.

(Item 6) The authentication device described in item 1; wherein the confirmation information output part outputs the confirmation information each time the valid first part is inputted.

(Item 7) The authentication device described in item 1; wherein the first input part allows the first part to be inputted via buttons of a telephone set located remotely from the authentication device; and the confirmation information output part outputs the confirmation information as audio signals to the receiver of the telephone set.

(Item 8) An authentication device for authenticating an inputter based on an input password accepted from the inputter, the authentication device comprising: a first input part for allowing the first part of the input password to be inputted in a predetermined input field; a confirmation information output part for outputting confirmation information known to the valid inputter in advance when the first part is valid, the confirmation information indicating to the user that the authentication device is valid; a second input part for allowing the second part of the input password to be inputted in the input field subsequently after the first part; and a determination part for determining that the inputter is valid when the first part and the second part are valid.

(Item 9) An authentication system comprising an input terminal for accepting an input password from an inputter and an authentication server for allowing the input terminal to authenticate the inputter, the input terminal comprising: a confirmation information obtaining part for obtaining from the authentication server, confirmation information known to the valid inputter in advance by the authentication server and indicating to the valid inputter that the input terminal is valid; a first input part for allowing the first part of the input password to be inputted; a confirmation information output part for outputting the confirmation information when the first part is valid; a second input part for allowing the second part of the input password to be inputted; and a determination part for determining that the inputter is valid when the first part and the second part are valid; and the authentication system comprising: a confirmation information transmission part for transmitting the confirmation information associated with the valid inputter in response to a direction by the input terminal.

(Item 10) An authentication method for authenticating an inputter based on an input password accepted from the inputter, the authentication method comprising the steps of: allowing the first part of the input password to be inputted; outputting confirmation information known to the valid inputter in advance when the first part is valid, the confirmation information indicating to the user that an authenticator is valid; allowing the second part of the input password to be inputted; and determining that the inputter is valid when the first part and the second part are valid.

(Item 11) An authentication method for authenticating an inputter based on an input password accepted from the inputter, the authentication method comprising: allowing the first part of the input password to be inputted in a predetermined input field; outputting confirmation information known to the valid inputter in advance when the first part is valid, the confirmation information indicating to the user that an authenticator is valid; allowing the second part of the input password to be inputted in the input field subsequently after the first part; and determining that the inputter is valid when the first part and the second part are valid.

(Item 12) A mutual authentication service provider providing a mutual authentication service for authenticating an inputter based on an input password accepted from the inputter via a computer as well as allowing the inputter to authenticate validity of a service site providing a predetermined service; the mutual authentication service comprising: an input password obtaining step for obtaining a valid input password set by the valid inputter in advance; a confirmation information obtaining step for obtaining confirmation information known to the valid inputter in advance and indicating to the valid inputter that the service site is valid; a first input step for allowing the first part of the input password to be inputted; a confirmation information outputting step for outputting the confirmation information when the first part is valid in comparison with the valid input password; a second input step for allowing the second part of the input password to be inputted; and a notification step for notifying the service site that the inputter is valid when the first part and the second part are valid.

(Item 13) A program for causing a computer as an authentication device for authenticating an inputter based on an input password accepted from the inputter; the program causing the computer to function as: a first input part for allowing the first part of the input password to be inputted; a confirmation information output part for outputting confirmation information known to the valid inputter in advance when the first part is valid, the confirmation information indicating to the user that the authentication device is valid; a second input part for allowing the second part of the input password to be inputted; and a determination part for determining that the inputter is valid when the first part and the second part are valid.

(Item 14) A program for causing a computer as an authentication device for authenticating an inputter based on an input password accepted from the inputter; the program causing the computer to function as: a first input part for allowing the first part of the input password to be inputted in a predetermined input field; a confirmation information output part for outputting confirmation information known to the valid inputter in advance when the first part is valid, the confirmation information indicating to the user that the authentication device is valid; a second input part for allowing the second part of the input password to be inputted in the input field subsequently after the first part; and a determination part for determining that the inputter is valid when the first part and the second part are valid.

(Item 15) A program for causing a computer to function as a mutual authentication service provider providing a mutual authentication service for authenticating an inputter based on an input password accepted from the inputter as well as allowing the inputter to authenticate validity of a service site providing a predetermined service; the program causing the computer to function as: an input password obtaining part for obtaining a valid input password set by the valid inputter in advance; a confirmation information obtaining part for obtaining confirmation information known to the valid inputter in advance and indicating to the valid inputter that the service site is valid; a first input part for allowing the first part of the input password to be inputted; a confirmation information outputting part for outputting the confirmation information when the first part is valid in comparison with the valid input password; a second input part for allowing the second part of the input password to be inputted; and a notification part for notifying the service site that the inputter is valid when the first part and the second part are valid.

(Item 16) A recording medium recording the program described in any of items 13 to 15.

Though the present invention has been described using an embodiment, the technical scope of the present invention is not limited to the scope described in the embodiment. A variety of changes and improvements can be made in the embodiment described above. It is apparent from the description in the Claims that such changed or improved embodiments are to be included in the technical scope of the present invention.

[Advantages of the Invention]

As apparent from the above description, an inputter of an input password can prevent the input password from being stolen by an invalid authentication device.

BRIEF DESCRIPTION OF THE DRAWINGS

FIG. 2 shows an example of information stored in an authentication information storing part 115;

DESCRIPTION OF SYMBOLS

Figure 1:
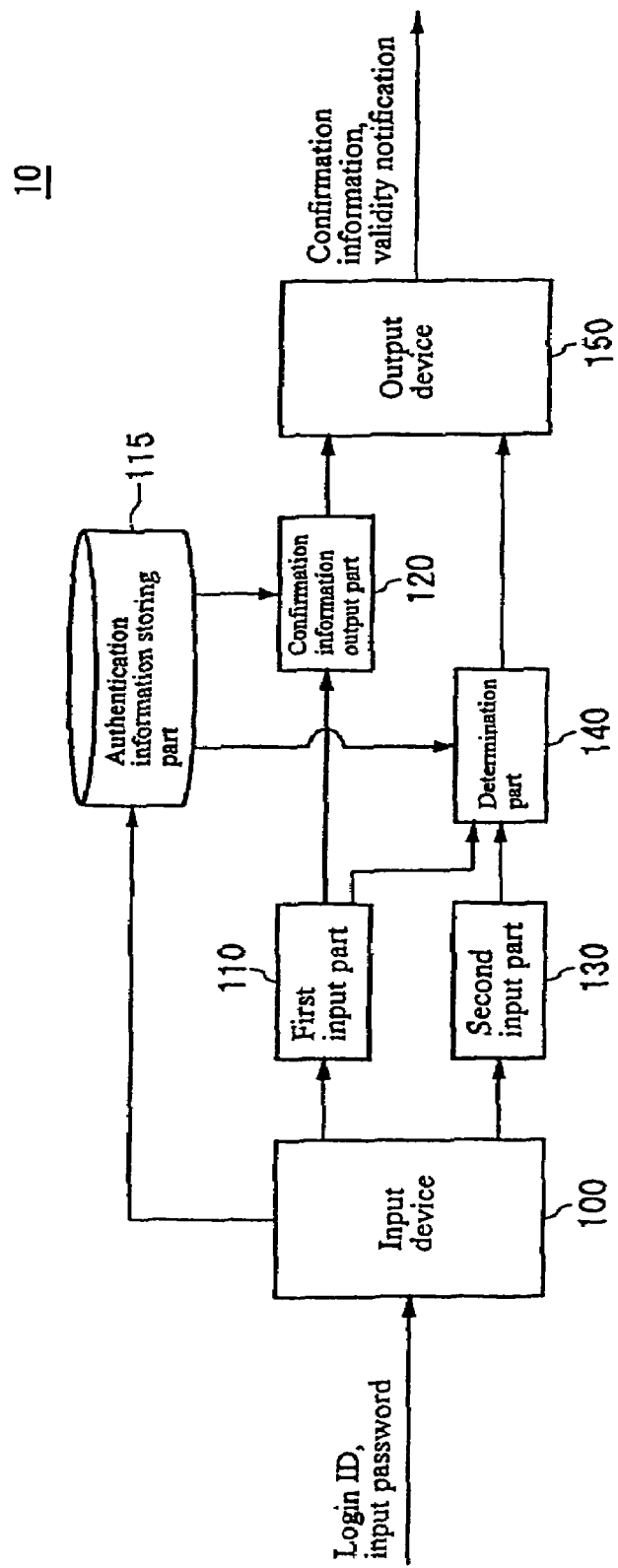
FIG. 1 is a functional block diagram of an authentication device 10.
Figure 3:
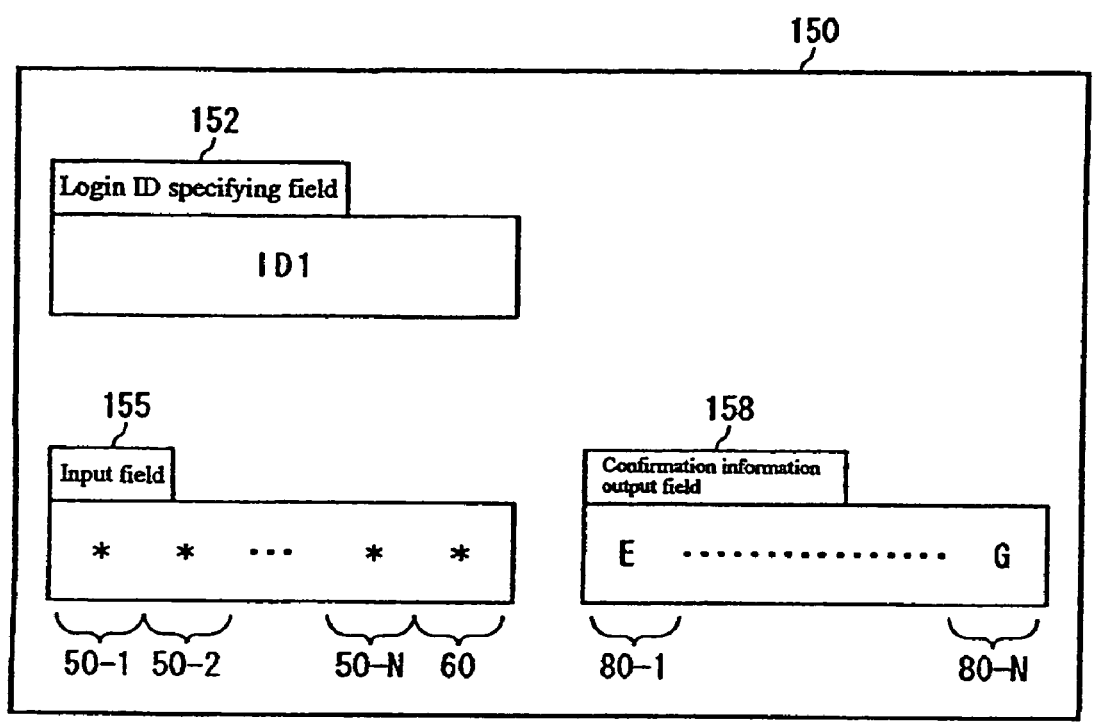
FIG. 3 shows a display example of an output device 150.
Figure 4:
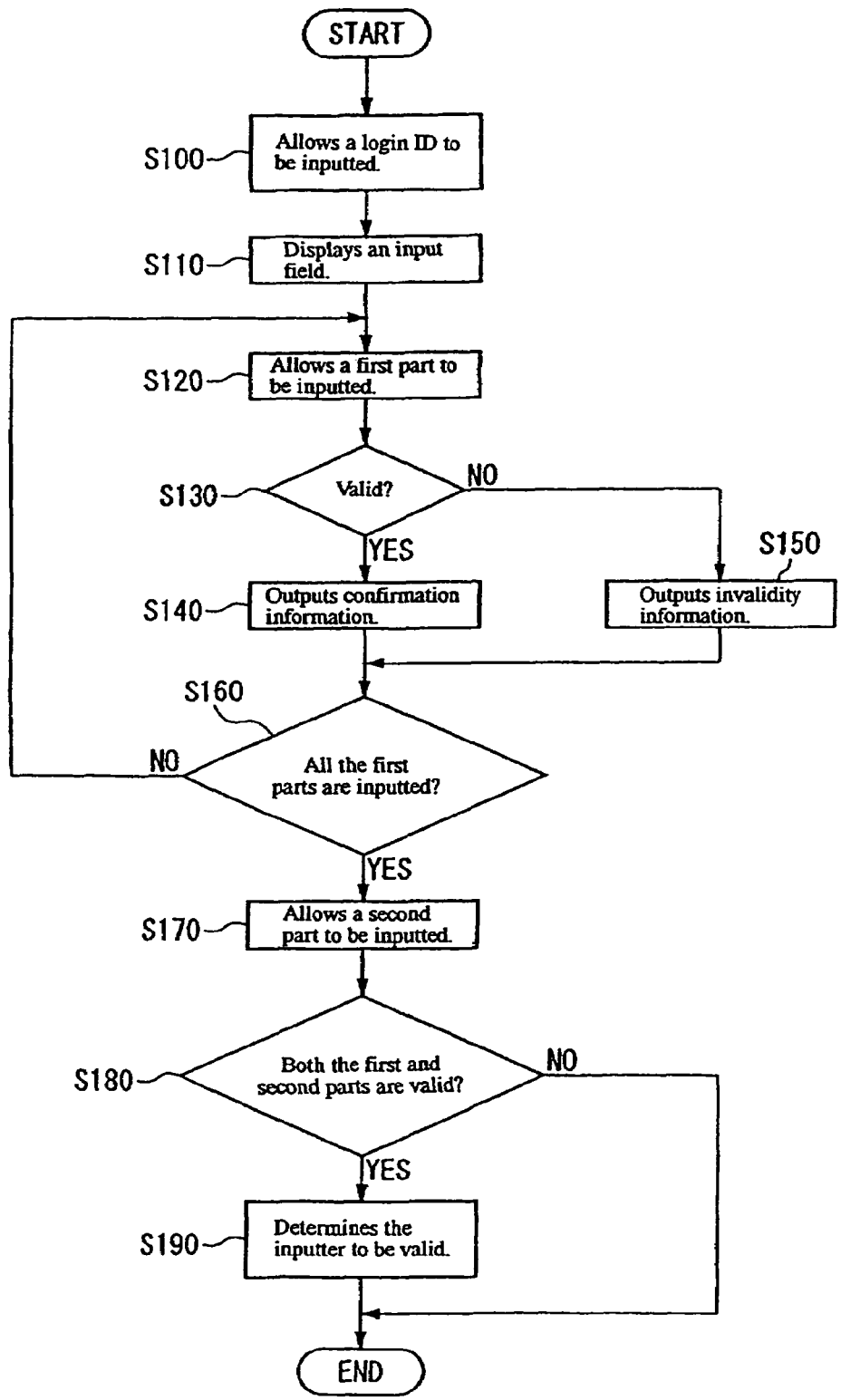
FIG. 4 shows the operation flow of an authentication device 10.
Figure 5:
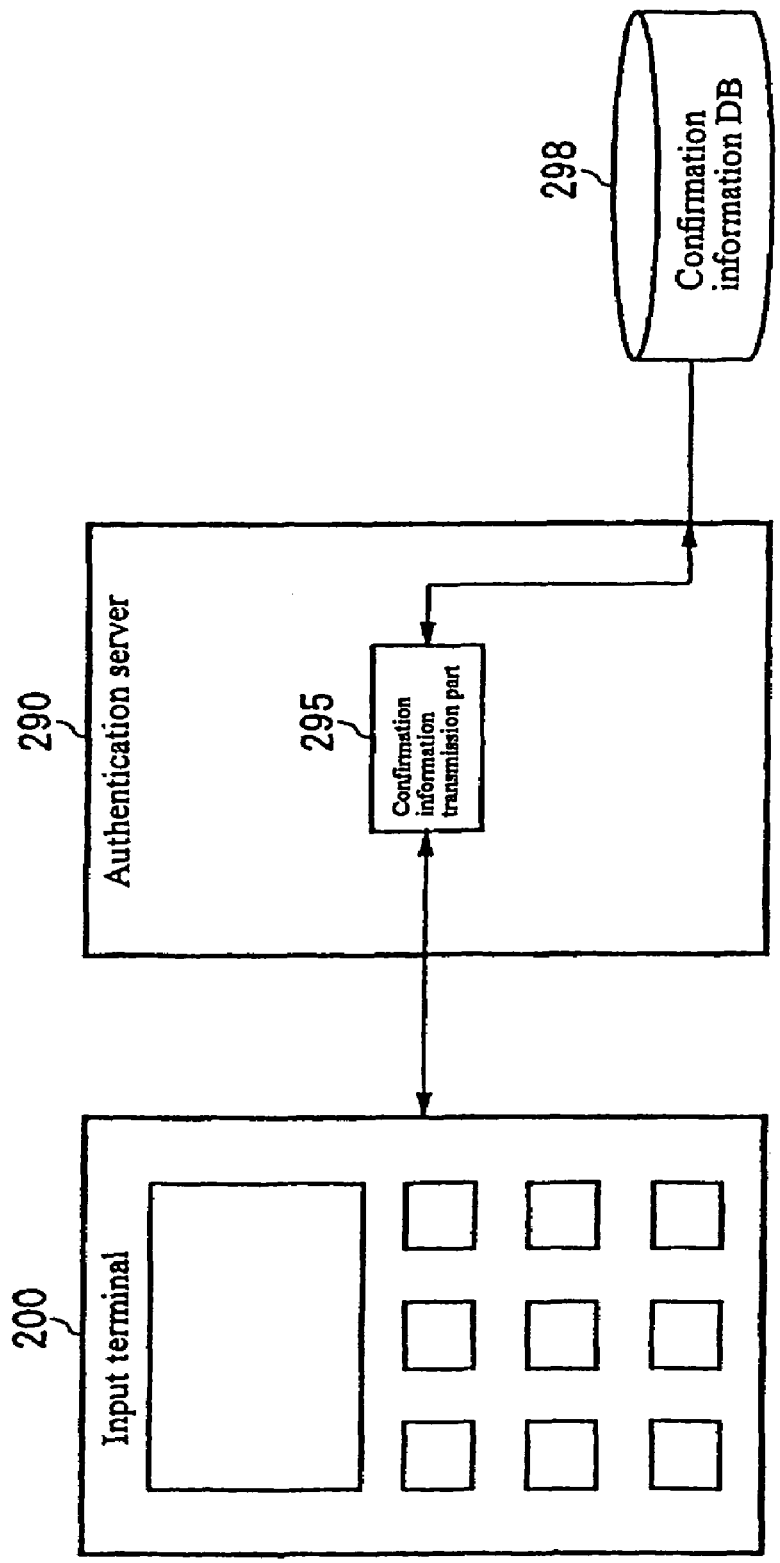
FIG. 5 shows an outline of an authentication system 20 in a first variation example.
Figure 6:
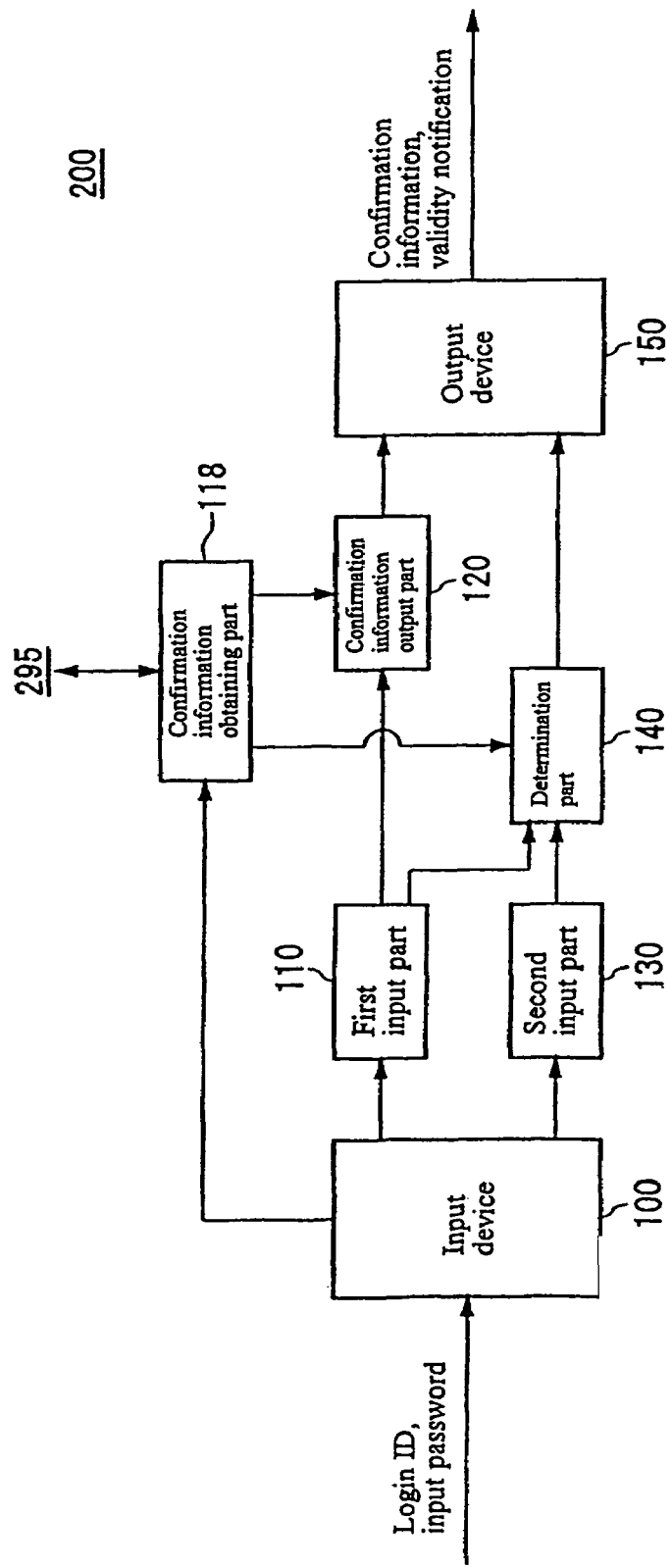
FIG. 6 is a functional block diagram of an input terminal 200 in a first variation example.
Figure 7:
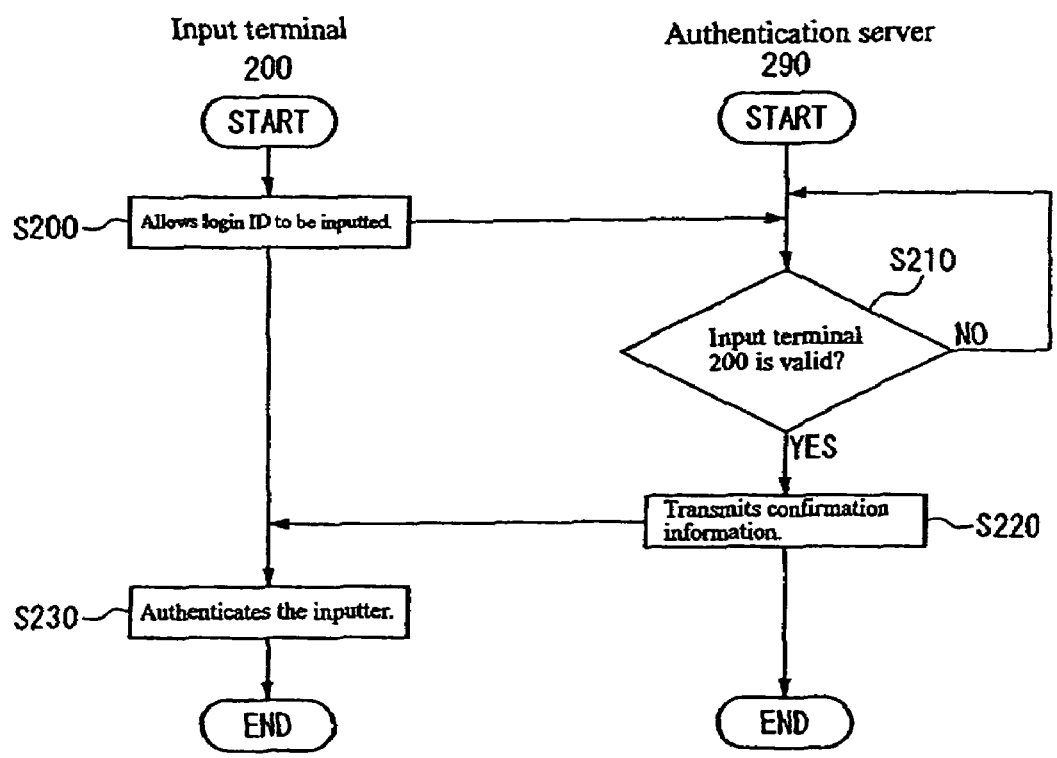
FIG. 7 shows the operation flow of an authentication system 20 in a first variation example.
Figure 8:
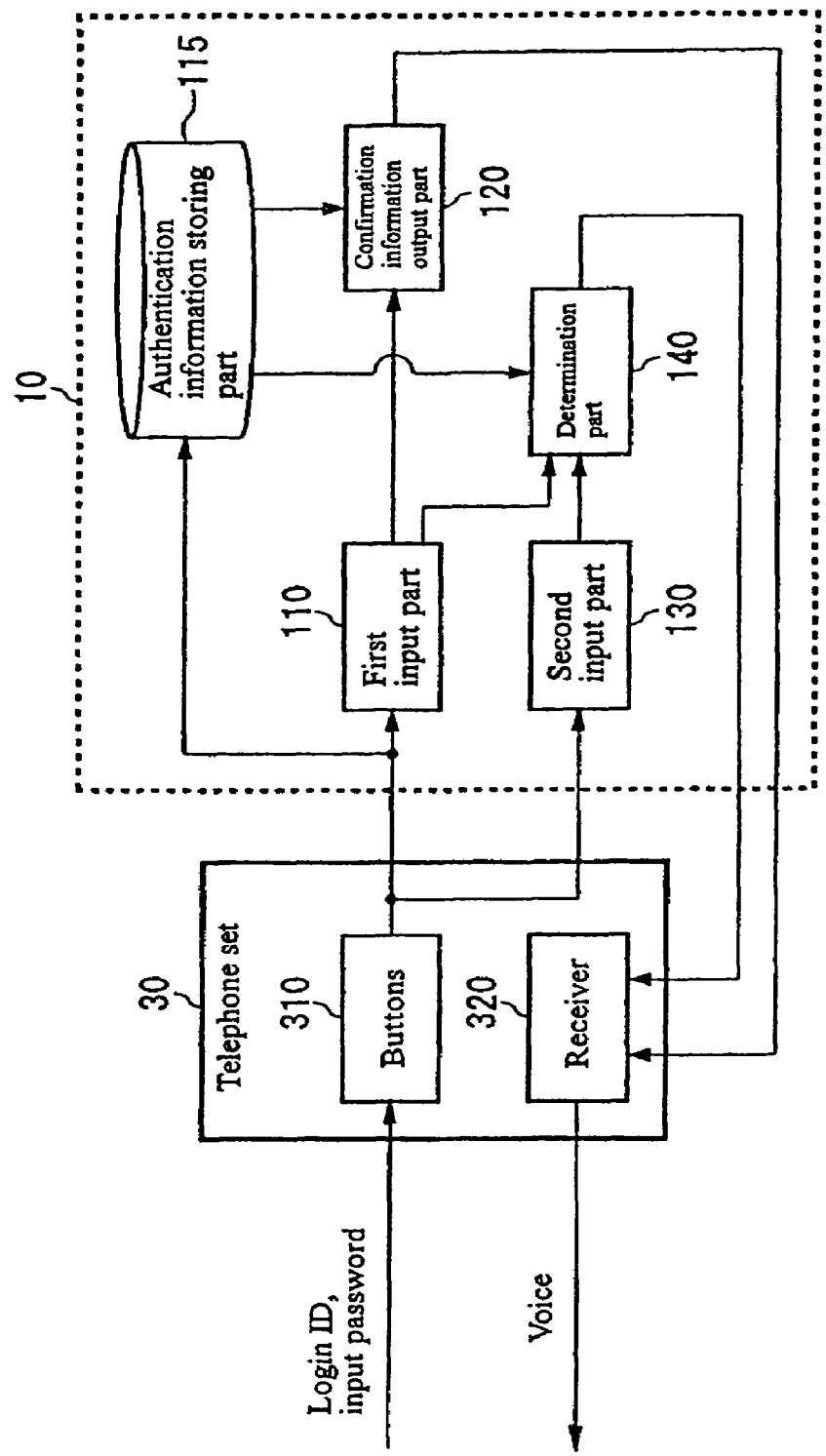
FIG. 8 is a functional block diagram of an authentication device 10 in a second variation example.
Figure 9:
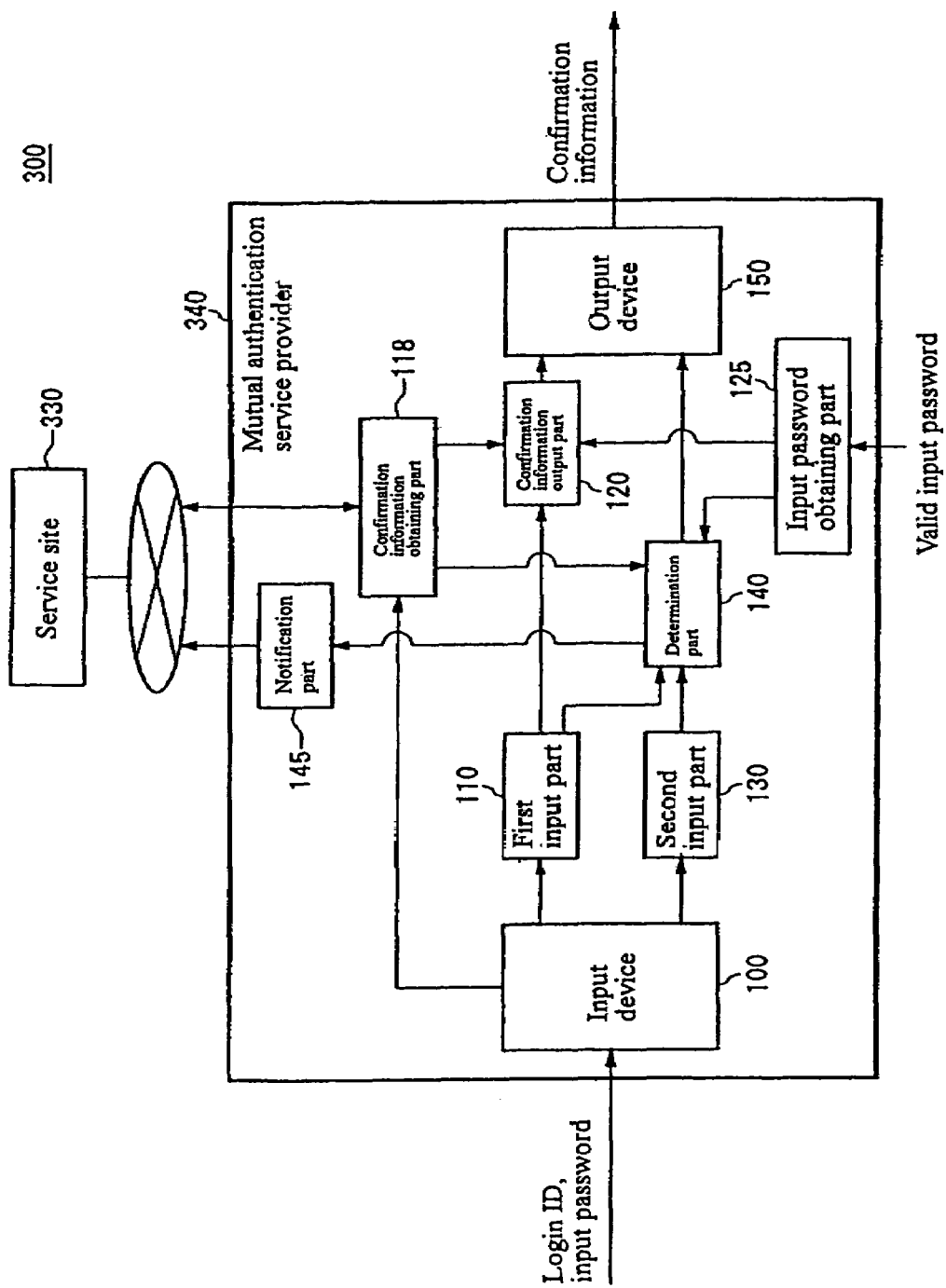
FIG. 9 is a functional block diagram of an authentication system 300 in a third variation example.
Figure 10:
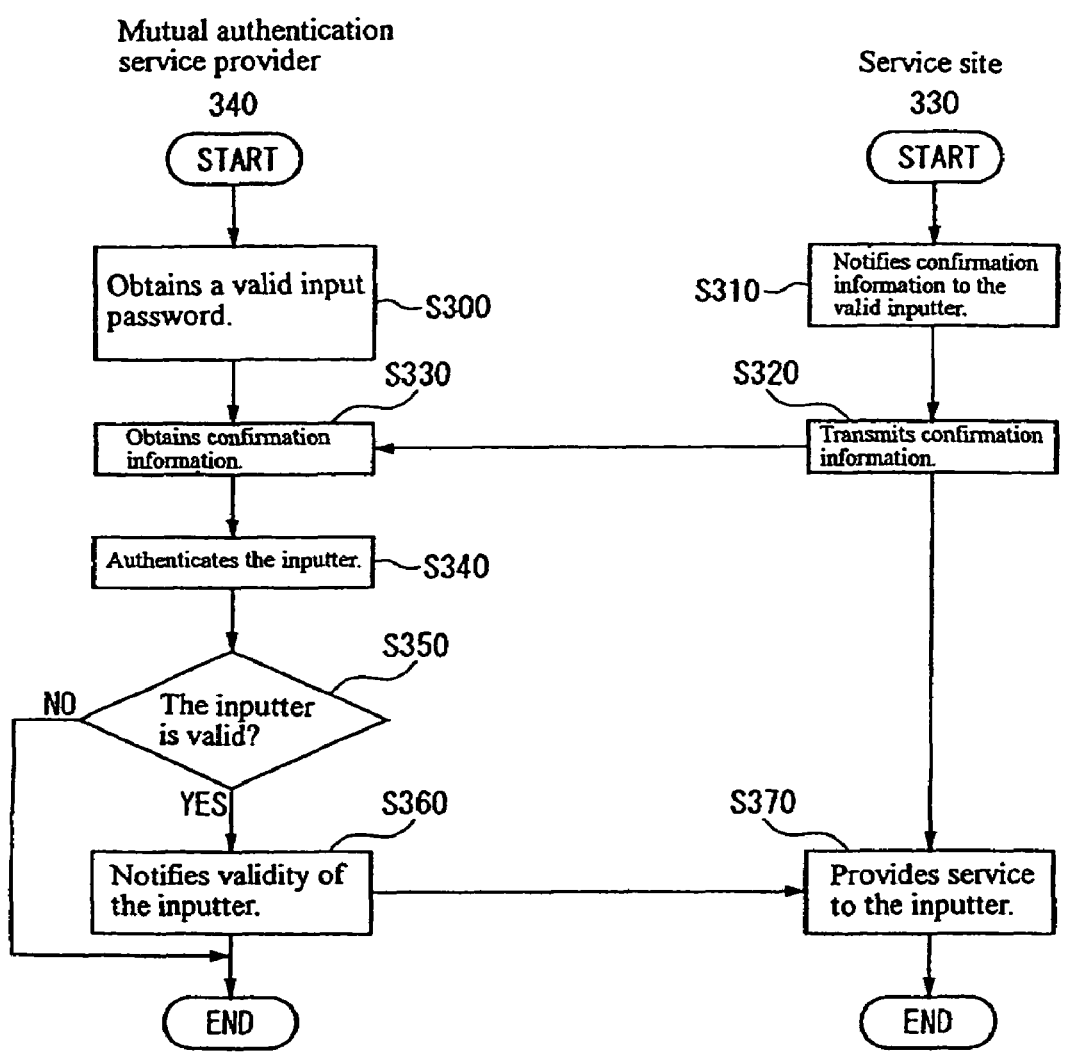
FIG. 10 shows the operation flow of an authentication system 300 in the third variation example.
Figure 11:
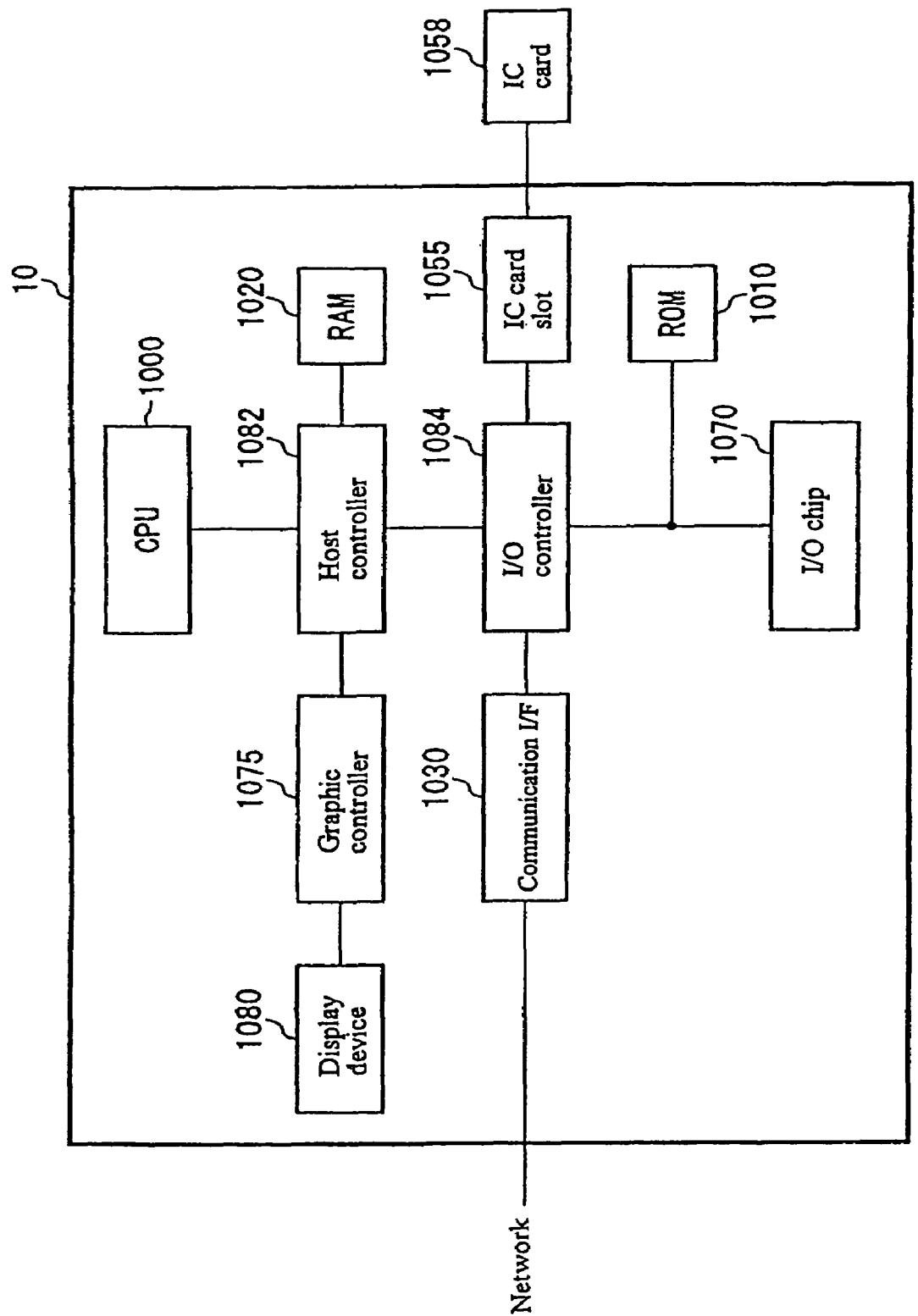
FIG. 11 shows an example of a hardware configuration of an authentication device 10 related to the embodiment and the variation examples shown above.

10 . . . Authentication device
20 . . . Authentication system
30 . . . Telephone set
50 . . . First part
60 . . . Second part
70 . . . Invalidity information
80 . . . Confirmation information
100 . . . Input device
110 . . . First input part
115 . . . Authentication information storing part
118 . . . Confirmation information obtaining part
120 . . . Confirmation information output part 120
125 . . . Input password obtaining part
130 . . . Second input part
140 . . . Determination part
145 . . . Notification part
150 . . . Output device
152 . . . Login ID specifying field
155 . . . Input password input field
158. . . . Confirmation information output field
200 . . . Input terminal
290 . . . Authentication server
295 . . . Confirmation information transmission part
298 . . . Authenticate information database
300 . . . Authentication system
310 . . . Buttons
320 . . . Receiver
330 . . . Service site
340 . . . Mutual authentication service provider Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A computer-implemented authentication device for authenticating an inputter based on an input password accepted from the inputter, the authentication device comprising:

an input device configured for receiving a first part of the input password to be inputted, said input password comprising a series of characters;

an output device configured for outputting confirmation information known to the inputter in advance when the first part of the received input password is valid, the confirmation information comprising a series of confirmation characters, each said confirmation character in one-to-one correspondence with a respective character of said series of characters of said first part of the input password and indicating to the inputter that the authentication device is valid;

said input device configured for allowing a second part of the input password to be inputted; and, a computer device, in communication with said input and output devices, configured for determining that the inputter is valid when the first part of the input password and the second part of the input password are valid, the output device outputting, when the first part of the input password is invalid, information identical to the confirmation information corresponding to one or more character inputs of said first part of the input password determined valid, and outputs invalidity information different from the confirmation information in correspondence with other said one or more character inputs of said first part of the input password determined invalid, the output invalidity information being associated with both an identification of the inputter to be authenticated and, the corresponding other one or more character inputs of the first part of the input password determined invalid.

2. The computer-implemented authentication device according to claim 1, further comprising: a memory storage device for storing output data to be outputted in association with a content of the one or more character inputs determined invalid in said input password first part, for each of a plurality of inputters.

3. The computer-implemented authentication device according to claim 1, wherein the input device is configured for receiving a successive input of a plurality of the character inputs; each of the plurality of character inputs is associated with each of a plurality of the confirmation information data to be outputted when the first part of the input password is determined valid; and when one or more characters of the first part of the input password is inputted, said output device outputs the confirmation information associated with the one or more characters if the one or more characters is valid, and outputs the invalidity information selected based on the one or more characters inputted so far if any of these one or more characters is invalid.

4. The computer-implemented authentication device according to claim 1, wherein the input device receives the first part of the input password to be inputted in a predetermined input field; and the input device receiving the second part of the input password to be inputted in the predetermined input field subsequently after the first part of the input password.

5. The computer-implemented authentication device according to claim 1, wherein the output device outputs the confirmation information each time the valid one or more characters of said first part of the input password is inputted.

6. A computer-implemented authentication device for authenticating an inputter based on an input password accepted from the inputter, the authentication device comprising:

an input device configured for receiving a first part of the input password to be inputted in a predetermined input field, said input password comprising a series of characters;

an output device configured for outputting confirmation information known to the valid inputter in advance when the first part is valid, the confirmation information comprising a series of confirmation characters, each confirmation character in one-to-one correspondence with a respective character of said series of characters of said first part of said input password and indicating to a user that the authentication device is valid;

said input device for receiving a second part of the input password to be inputted in the predetermined input field subsequently after the first part of the input password; and a computer device, in communication with said input and output devices, configured for determining that the inputter is valid when the first part of the input password and the second part of the input password are valid, the output device outputs, when the first part of the input password is invalid, information identical to the confirmation information corresponding to one or more character inputs of said first part of the input password determined valid, and outputs invalidity information different from the confirmation information in correspondence with other said one or more character inputs of said first part of the input password determined invalid, the invalidity information output being associated with both an identification of the inputter to be authenticated and, the corresponding other one or more character inputs of the first part of the input password determined invalid.

7. An authentication system comprising an input terminal for accepting an input password from an inputter and an authentication computer server configured for allowing the input terminal to authenticate the inputter, the input terminal comprising:

a first input device in communication with said authentication computer server for receiving from the authentication computer server, confirmation information comprising a series of confirmation characters, each confirmation character in one-to-one correspondence with a respective character of a series of characters of said input password and known to the inputter in advance by the authentication server and indicating to the inputter that the input terminal is valid;

a second input device configured for receiving a first part of the input password to be inputted, said input password comprising said series of characters;

an output device configured for outputting the confirmation information when the first part of the received input password is valid;

said second input device configured for receiving a second part of the input password to be inputted; and a computer device, in communication with said first and second input devices and output device, configured for determining that the inputter is valid when the first part of the input password and the second part of the input password are valid, the output device outputs, when the first part of the input password is invalid, information identical to the confirmation information corresponding to one or more character inputs of said first part of the input password determined valid, and outputs invalidity information different from the confirmation information in correspondence with other one or more character inputs of said first part of the input password determined invalid, the invalidity information output being associated with both an identification of the inputter to be authenticated and, the corresponding other one or more character inputs of the first part of the input password determined invalid; and the authentication computer server further comprising:

a confirmation information transmission part configured for transmitting the confirmation information associated with the inputter to said first input device in response to a direction by the input terminal.

8. An authentication method for authenticating an inputter based on an input password accepted from the inputter, the authentication method comprising the steps of:

receiving, at an input device, a first part of the input password to be inputted, said input password comprising a series of characters;

outputting, at an output device, confirmation information known to the inputter in advance when the received first part of the input password is valid, the confirmation information comprising a series of confirmation characters, each confirmation character in one-to-one correspondence with a respective character of said series of characters of said first part of said input password and indicating to a user that an authenticator is valid;

receiving, at said input device, a second part of the input password to be inputted; and determining, at a computer device in communication with said input and output devices, that the inputter is valid when the first part of the input password and the second part of the input password are valid, outputting, via said output device, when the first part of the input password is invalid, information identical to the confirmation information corresponding to one or more character inputs of said first part of the input password determined valid, and outputs invalidity information different from the confirmation information in correspondence with other one or more character inputs of said first part of the input password determined invalid, the invalidity information output being associated with both an identification of the inputter to be authenticated and, the corresponding other one or more character inputs of the first part of the input password determined invalid.

9. An authentication method for authenticating an inputter based on an input password accepted from the inputter, the authentication method comprising:

receiving, at an input device, a first part of the input password to be inputted in a predetermined input field, said input password comprising a series of characters;

outputting, at an output device, confirmation information known to the inputter in advance when the first part of the input password is valid, the confirmation information comprising a series of confirmation characters, each confirmation character in one-to-one correspondence with a respective character of said series of characters of said first part of said input password and indicating to a user that an authenticator is valid;

receiving, at an input device, a second part of the input password to be inputted in the predetermined input field subsequently after the first part of the received input password; and determining, at a computer device in communication with said input and output devices, that the inputter is valid when the first part of the input password and the second part of the input password are valid, and outputting, via said output device, when the first part of the input password is invalid, information identical to the confirmation information corresponding to one or more character inputs of said first part of the input password determined valid, and outputs invalidity information different from the confirmation information for other one or more character inputs of said first part of the input password determined invalid, the invalidity information output being associated with both an identification of the inputter to be authenticated and, the corresponding other one or more character inputs of the first part of the input password determined invalid.

10. A program storage device readable by machine, tangibly embodying a program of instructions executable by the machine to perform method steps for authenticating an inputter based on an input password accepted from the inputter, said method steps comprising the steps of:

allowing a first part of the input password to be inputted, said input password comprising a series of characters;

outputting confirmation information known to the inputter in advance when the first part of the input password is valid, the confirmation information comprising a series of confirmation characters, each confirmation character in one-to-one correspondence with a respective character of said series of characters of said first part of said input password and indicating to a user that an authenticator is valid;

allowing a second part of the input password to be inputted; and determining that the inputter is valid when the first part of the input password and the second part of the input password are valid, outputting, when the first part of the input password is invalid, information identical to the confirmation information corresponding to one or more character inputs of said first part of the input password determined valid, and outputting invalidity information different from the confirmation information in correspondence with other one or more character inputs of said first part of the input password determined invalid, the invalidity information output being associated with both an identification of the inputter to be authenticated and, the corresponding other one or more character inputs of the first part of the input password determined invalid.

11. A program storage device readable by machine, tangibly embodying a program of instructions executable by the machine to perform method steps for authenticating an inputter based on an input password accepted from the inputter, said method steps comprising the steps of:

allowing a first part of the input password to be inputted in a predetermined input field, said input password comprising a series of characters;

outputting confirmation information known to the inputter in advance when the first part of the input password is valid, the confirmation information comprising a series of confirmation characters, each confirmation character in one-to-one correspondence with a respective character of said series of characters of said first part of said input password and indicating to a user that an authenticator is valid;

allowing a second part of the input password to be inputted in the predetermined input field subsequently after the first part of the input password; and determining that the inputter is valid when the first part of the input password and the second part of the input password are valid, outputting, when the first part of the input password is invalid, information identical to the confirmation information corresponding to one or more character inputs of said first part of the input password determined valid, and outputting invalidity information different from the confirmation information in correspondence with other one or more character inputs of said first part of the input password determined invalid, the invalidity information output being associated with both an identification of the inputter to be authenticated and, the corresponding other one or more character inputs of the first part of the input password determined invalid.

12. The computer-implemented authentication device according to claim 2, wherein said input device comprises a telephone set located remotely from the computer-implemented authentication device and having buttons via which the first input part of the input password is inputted, said output device comprising a receiver of said telephone set, said receiver outputting said series of confirmation characters of the confirmation information as audio signals.

* * * * *

UNITED STATES PATENT AND TRADEMARK OFFICE
CERTIFICATE OF CORRECTION

| | |
|---|---|
| PATENT NO. | : 7,610,489 B2 |
| APPLICATION NO. | : 10/739817 |
| DATED | : October 27, 2009 |
| INVENTOR(S) | : Maruyama et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1297 days.

Signed and Sealed this

Twelfth Day of October, 2010

David J. Kappos
*Director of the United States Patent and Trademark Office*